Patented Apr. 16, 1935

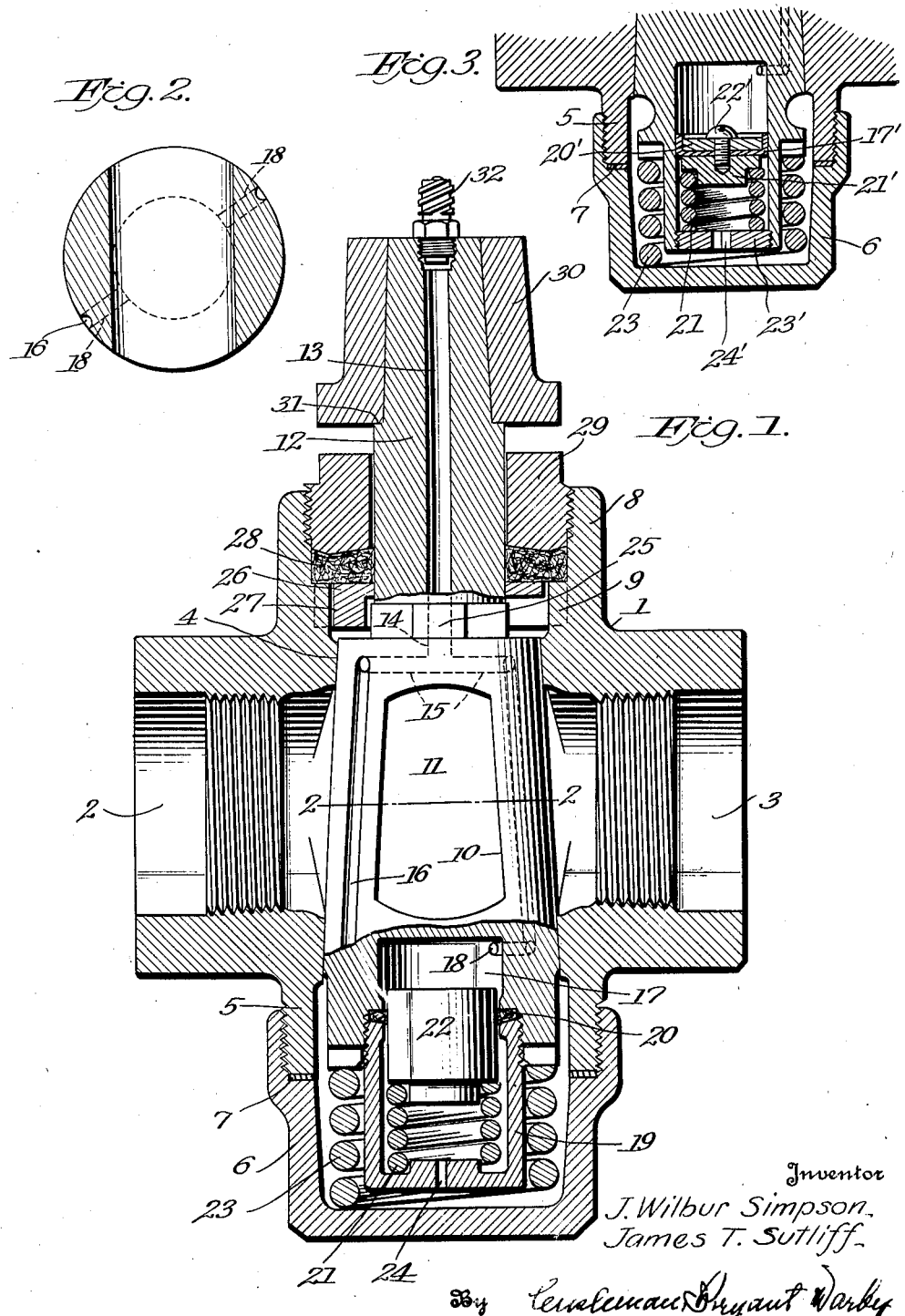

1,998,029

UNITED STATES PATENT OFFICE 1,998,029

AUTOMATIC LUBRICATED GAS STOP

James Wilbur Simpson and James T. Sutliff, Decatur, Ill., assignors to Mueller Co., Decatur, Ill., a corporation of Illinois Application April 17, 1929, Serial No. 355,817

5 Claims. (Cl. 251—93)

The present invention relates to an automatic lubricated stop construction, and while particularly designed for use in connection with gaseous fluids, is equally applicable to meet the requirements of fluid control under various circumstances.

An important object of the invention is to assure a proper lubrication at all times, and in order that this unfailing flow of lubricant under pressure may be present, means are provided for continuously acting upon the lubricant to force it through the grooves or channels.

A further object of the invention is to provide a construction which is marked by extreme simplicity and ease of assembling, and which, therefore, can be readily taken apart and repaired or replaced as required.

A further object of the invention is to maintain an unfailing lubricant flow under pressure, so that the valve plug will, when in closed position, act as a complete seal to fluid flow.

In the drawing:

Figure 1 is a sectional view.

Figure 2 is a view along the line 2—2 of Figure 1, and

Figure 3 is a view of another embodiment of the cup and piston structure.

The invention comprises the usual casing 1, having an inlet 2, and an outlet 3. An intermediate valve seat 4 is provided, which, as shown in the drawing, is tapered, although not necessarily so.

The casing at its bottom adjacent the seat is provided with a threaded opening 5, and receives a suitable cap 6, packing 7 being positioned between the meeting edges of the casing and the cap.

At its upper end the casing is provided with a somewhat similar threaded opening 8, and its inner wall upon opposite sides adjacent the lower part of said opening is provided with slots 9 for a purpose which will later be described.

The valve plug is indicated as a whole at 10, and as usual, is provided with an opening 11. The body of the plug extends upwardly, and said upper portion comprises a hollow stem 12 having an opening 13 therethrough. This opening extends centrally into the smaller end of the plug, as at 14, and communicates with one or more axially extending branches 15 formed in the plug. These branches terminate in grooves 16, formed exteriorly of the plug body, and which extend longitudinally thereof. In lieu of forming the grooves in the body it is, of course, quite clear that they may be formed in the seat 4.

The lower end of the plug is provided with a lubricant recess 17, from which extend ports 18, which communicate exteriorly of the plug with one or more of the grooves 16. This recess is internally threaded to receive a threaded hollow cup-shaped member 19. The joint between the cup-shaped member and the lower end of the plug is suitably packed, as shown at 20. Carried within the cup-shaped member 19 is a suitable spiral spring 21, which is held between the bottom of the cup and a piston 22, which is movable within the cup member and within the recess 17, past the packing 20.

The lower end of the valve body and the cup 19 form, in connection with the cap 6, a space in which is positioned a spiral spring 23. This spring engages the wall of the cap and the bottom of the plug, and acts to maintain the plug seated firmly and properly in position at all times.

It will be noted that an opening 24 is formed in the cup-shaped member 19, in order to let out air when necessary.

The lower end of the stem of the plug is provided with a collar having a projection 25 thereon, and fitted within the opening 8 is a sleeve 26 having projections engaging in the slots 9 to fix the sleeve in position. The said sleeve is formed with a solid downward projection 27, with which the projection 25 on the plug collar engages, to determine the open and closed positions of the plug opening 11 with respect to the openings 2 and 3 of the valve casing.

Disposed above the sleeve 26 is a suitable packing 28 and above the said packing is threaded a suitable washer or nut 29. At its outer end the stem is provided with an adapter nut 30, which is tapered in accordance with the taper of the stem, and rests upon a flange formed, as shown at 31, on the stem.

The opening 13 in the stem is closed by a pressure fitting 32, which may assume any form, but should be designed to receive a pump which will be attached to the fitting and permit lubricant to be delivered under high pressure.

In the operation of the invention, a pump containing lubricant is applied to the fitting 32, and the lubricant is forced therethrough, and through the opening 13 into the branches 15 and grooves 16, from whence it passes through ports 18 into the lubricant chamber 17 and continuous supplying of the lubricant under pressure will act to force the piston 22 downwardly against the spring 21. When a sufficient amount of lubricant has been forced into the valve, and a full charge of lubricant has been supplied, the spring 21 will be compressed solid and no more lubricant can possibly be forced in. The pump is removed and the fitting 32 being pressure-tight, the piston 22 being under spring pressure, will serve to at all times force lubricant upwardly through the channels as described.

It will be observed that the piston 22 is adapted to move in the chamber defined by the recess 17 and the cup member 19, and that the packing 20 will contact with the surface of the piston during its movement to prevent as far as possible, any passage of lubricant from the chamber 17 into the cup 19.

The fitting 32 may be any usual type of fitting having a spring pressed valve member adapted to open inwardly under pressure, but to be closed as soon as the pressure forming lubricant pump or other means attachable to the fitting is removed.

Referring to Fig. 3, it will be observed that the walls of the cup are made integral with the lower portion of the plug 10, and form an extension thereof. In this embodiment, the packing 20 and piston 22 are replaced by a cup-leather 17' disposed between a two-piece piston 20', 21. The two piston members are secured together by a screw, or rivet, or other means 22' whereby the cup-leather 17' is confined with its flanged portion extending about the upper piston member to form a fluid-tight connection with the integral wall of the cup. The cup is closed by a threaded cap 23' having a central opening 24 therein, being in these and in all respects similar to the disclosure in Fig. 1.

It will be understood that the present invention overcomes the inherent difficulty of most existing types of lubricating stops, wherein forcing in of lubricant beyond a certain amount, results in unseating the plug so that it leaks until by repeated turning, and movement of the parts, the excess grease is worked out. In other words, the parts are severely worn, and grease is wasted, and it is this which the present invention appreciates and thus overcomes.

The invention is capable of various modifications and alterations, all of which are considered to be covered within the appended claims.

What we claim is:

1. A device of the class described comprising a valve casing having a valve seat, a valve in said seat, a lubricant chamber in said valve, a lubricant passage formed by the seating surface of said valve and said seat and communicating with said chamber, a piston member in said chamber normally pressed by resilient means to force lubricant from said chamber in one direction, and an opening in said valve communicating with said passage for the introduction of lubricant under pressure to press said piston in the opposite direction against said means and store a supply of lubricant under pressure in said chamber and in said passage, said piston and resilient means being movable in a housing connected to said valve.

2. A device of the class described comprising a valve casing having a valve seat, a valve in said seat, a lubricant chamber in said valve, a lubricant passage formed by the seating surface of said valve and said seat and communicating with said chamber, a piston member in said chamber normally pressed by resilient means to force lubricant from said chamber in one direction, and an opening in said valve communicating with said passage for the introduction of lubricant under pressure to press said piston in the opposite direction against said means and store a supply of lubricant under pressure in said chamber and in said passage, and means at all times acting on said valve to force it against its seat, said resiliently actuated piston at the same time acting to force lubricant into said passage between the seating surface of said valve and seat, said piston and associated resilient means being movable in a housing connected to said valve, and said resilient means acting on said valve being located outside of said housing and enclosed in a cup-shaped member secured to said casing.

3. A device of the class described comprising a valve casing having a tapered valve seat, a tapered plug mounted in said seat, said plug having a lubricating chamber in its larger end, a lubricating passage in the seating surface, said passage communicating with said chamber, a piston in said chamber, resilient means confined between said piston and the adjacent end of said plug for normally urging said piston inwardly to force lubricant from said chamber to the seating surface and resilient means confined between said casing and the larger end of said plug for urging the latter into engagement with said seat.

4. A device of the class described comprising a valve casing having a tapered valve seat, a tapered plug rotatably mounted in said seat, said plug having a lubricating chamber in its larger end, a lubricating passage in the seating surface, said lubricating passage communicating with said chamber, an abutment member for said lubricating chamber, a piston in said chamber, yieldable means between said abutment member and piston for normally urging the latter inwardly to force lubricant from said chamber and through said passage to the seating surface, a cap connected to said casing and spaced from said abutment member and resilient means confined between said cap and the larger end of said plug for urging the latter into engagement with said valve seat.

5. A device of the class described comprising a valve casing having a tapered valve seat closed at its larger end, a tapered plug rotatably mounted in said seat, a chamber formed in the larger end of said plug, a piston within said chamber, the smaller end of the valve plug being provided with a normally closed aperture for introduction of lubricant under pressure, a passage communicating with the aperture, said chamber and the valve seat, resilient means carried by said plug for urging the piston inwardly to maintain the lubricant under pressure, and means within said casing bearing upon the larger end of said plug to hold the latter upon said seat.

J. WILBUR SIMPSON.
JAMES T. SUTLIFF.